(12) United States Patent
Kerselaers et al.

(10) Patent No.: US 10,014,578 B2
(45) Date of Patent: Jul. 3, 2018

(54) BODY ANTENNA SYSTEM

(71) Applicant: NXP B.V., Eindhoven (NL)

(72) Inventors: Anthony Kerselaers, Louvain (BE); Liesbeth Gomme, Heverlee (BE); Steven Thoen, Leuven (BE)

(73) Assignee: NXP B.V., Austin, TX (US)

( * ) Notice: Subject to any disclaimer, the term of this patent is extended or adjusted under 35 U.S.C. 154(b) by 0 days.

(21) Appl. No.: 14/575,865

(22) Filed: Dec. 18, 2014

(65) Prior Publication Data

US 2015/0318613 A1 Nov. 5, 2015

Related U.S. Application Data

(63) Continuation-in-part of application No. 14/270,013, filed on May 5, 2014, and a continuation-in-part of application No. 14/302,791, filed on Jun. 12, 2014.

(51) Int. Cl.
| | |
|---|---|
| *H01Q 7/00* | (2006.01) |
| *H01Q 1/27* | (2006.01) |
| *H04R 31/00* | (2006.01) |
| *H04B 1/40* | (2015.01) |
| *H04B 5/00* | (2006.01) |

(Continued)

(52) U.S. Cl.
CPC .............. *H01Q 7/00* (2013.01); *H01Q 1/273* (2013.01); *H01Q 7/005* (2013.01); *H04B 1/40* (2013.01); *H04B 5/0012* (2013.01); *H04B 5/0031* (2013.01); *H04B 5/0081* (2013.01); *H04B 5/0087* (2013.01); *H04B 5/0093* (2013.01); *H04B 5/02* (2013.01); *H04B 13/005* (2013.01); *H01F 2038/146* (2013.01); *H04R 25/554* (2013.01); *H04R 2225/51* (2013.01)

(58) Field of Classification Search
CPC ............ H01Q 7/00; H01Q 1/273; H01Q 1/36; H01Q 1/14; H04B 1/40; H04B 5/00; H04B 5/0031; H04R 25/558; H04R 25/554; A61B 5/0002; H02J 7/025; H02J 50/00; H02J 50/90
See application file for complete search history.

(56) References Cited

U.S. PATENT DOCUMENTS

| | | |
|---|---|---|
| 3,766,476 A | 10/1973 | Silitch |
| 4,334,315 A | 6/1982 | Ono |

(Continued)

FOREIGN PATENT DOCUMENTS

| | | |
|---|---|---|
| CN | 102013895 A | 4/2011 |
| CN | 102570000 A | 7/2012 |

(Continued)

OTHER PUBLICATIONS

Zimmerman, Personal Area Networks: Nears-Field Intrabody Communication, IMB Systems Journal, vol. 35, 1996, pp. 609-617.*

(Continued)

*Primary Examiner* — Fan Tsang
*Assistant Examiner* — Angelica M McKinney

(57) ABSTRACT

An electromagnetic induction antenna including: a first inductor including windings; a second inductor including windings spaced apart from the first inductor; and an impedance connecting the first and second inductors; wherein the first and second inductor form a capacitor; wherein the capacitor is an electric field antenna, and wherein the inductor is a magnetic field antenna.

20 Claims, 14 Drawing Sheets

(51) Int. Cl.
  H04B 5/02  (2006.01)
  H04B 13/00 (2006.01)
  H01F 38/14    (2006.01)
  H04R 25/00    (2006.01)

(56) References Cited

U.S. PATENT DOCUMENTS

| | | |
|---|---|---|
| 4,692,743 A | 9/1987 | Holden |
| 5,673,054 A | 9/1997 | Hama |
| 5,708,732 A | 1/1998 | Merhav et al. |
| 5,907,522 A * | 5/1999 | Teodoridis ............ H01Q 1/273 343/718 |
| 5,914,701 A | 6/1999 | Gersheneld |
| 5,926,573 A | 7/1999 | Kim et al. |
| 5,948,006 A | 9/1999 | Mann |
| 6,104,913 A | 8/2000 | McAllister |
| 6,211,799 B1 | 4/2001 | Post |
| 6,223,018 B1 | 4/2001 | Fukumoto et al. |
| 6,275,737 B1 | 8/2001 | Mann |
| 6,424,820 B1 | 7/2002 | Burdick et al. |
| 6,754,472 B1 | 6/2004 | Williams |
| 6,816,600 B1 * | 11/2004 | Jakob .................. H04R 25/558 381/312 |
| 7,142,681 B2 | 11/2006 | Kortekaas |
| 7,171,177 B2 | 1/2007 | Park et al. |
| 7,206,423 B1 | 4/2007 | Feng et al. |
| 7,254,246 B2 | 8/2007 | Jakob |
| 7,509,092 B2 | 3/2009 | Ishibashi et al. |
| 7,664,476 B2 | 2/2010 | Yanagida |
| 7,684,769 B2 | 3/2010 | Song et al. |
| 7,783,067 B1 | 8/2010 | Frerking |
| 7,796,943 B2 | 9/2010 | Levan |
| 7,907,057 B2 | 3/2011 | Schaffler et al. |
| 8,005,547 B2 | 8/2011 | Forsberg |
| 8,237,622 B2 | 8/2012 | Furumura et al. |
| 8,265,554 B2 | 9/2012 | Hwang |
| 8,280,302 B2 | 10/2012 | Kubono |
| 8,401,470 B2 | 3/2013 | Kroenstoel et al. |
| 8,452,234 B2 | 5/2013 | Hasegawa et al. |
| 8,509,689 B2 | 8/2013 | Nakamura et al. |
| 8,526,879 B2 | 9/2013 | Kristiansen |
| 8,606,177 B2 | 12/2013 | Hwang |
| 8,644,542 B2 | 2/2014 | Klemenz |
| 8,797,148 B2 | 8/2014 | Kato et al. |
| 8,829,725 B2 | 9/2014 | Urano |
| 8,878,735 B2 | 11/2014 | Kvist et al. |
| 8,892,055 B2 | 11/2014 | Gasperi |
| 8,909,966 B2 | 12/2014 | Furukawa |
| 9,019,131 B2 | 4/2015 | Kim |
| 9,024,725 B2 | 5/2015 | Ikemoto |
| 9,083,391 B2 | 7/2015 | Teggatz |
| 9,130,273 B2 | 9/2015 | Kataoka |
| 9,197,986 B1 | 11/2015 | Kerselaers et al. |
| 9,314,381 B2 | 4/2016 | Curran et al. |
| 9,455,771 B2 | 9/2016 | Dobyns |
| 9,647,462 B2 | 5/2017 | Angst et al. |
| 2002/0003503 A1 | 1/2002 | Justice |
| 2002/0181579 A1 | 12/2002 | Vetro et al. |
| 2004/0023216 A1 | 2/2004 | Lu et al. |
| 2004/0027296 A1 | 2/2004 | Gerber |
| 2004/0138723 A1 | 7/2004 | Malick et al. |
| 2005/0058201 A1 | 3/2005 | Fernandes |
| 2006/0008038 A1 | 1/2006 | Song et al. |
| 2006/0114993 A1 | 6/2006 | Xiong et al. |
| 2006/0134918 A1 | 6/2006 | Fuji et al. |
| 2006/0215919 A1 | 9/2006 | Srinivasan |
| 2006/0233258 A1 | 10/2006 | Holcomb |
| 2006/0252371 A1 | 11/2006 | Toshiharu |
| 2007/0058713 A1 | 3/2007 | Shen et al. |
| 2007/0116308 A1 | 5/2007 | Zurek et al. |
| 2007/0190940 A1 | 8/2007 | Lee et al. |
| 2007/0291970 A1 * | 12/2007 | Nikles .................. H04R 25/554 381/315 |
| 2008/0182517 A1 | 7/2008 | Rass |
| 2008/0186241 A1 | 8/2008 | Christensen |
| 2008/0261523 A1 | 10/2008 | Kubono et al. |
| 2008/0262376 A1 | 10/2008 | Price |
| 2008/0267436 A1 | 10/2008 | Kerselaers et al. |
| 2009/0041241 A1 | 2/2009 | Dobyns et al. |
| 2009/0067653 A1 | 3/2009 | Meskens et al. |
| 2009/0202084 A1 | 8/2009 | Joeng et al. |
| 2009/0238279 A1 | 9/2009 | Tu et al. |
| 2009/0315787 A1 * | 12/2009 | Schatzle ................ H01Q 1/273 343/702 |
| 2009/0322540 A1 * | 12/2009 | Richardson .......... A61B 5/0002 340/573.7 |
| 2010/0036773 A1 | 2/2010 | Bennet |
| 2010/0136905 A1 | 6/2010 | Kristiansen |
| 2010/0311326 A1 | 12/2010 | Klabunde et al. |
| 2011/0029041 A1 | 2/2011 | Wiskerke |
| 2011/0046730 A1 | 2/2011 | Meskens |
| 2011/0137649 A1 | 6/2011 | Rasmussen |
| 2011/0196452 A1 | 8/2011 | Forsell |
| 2011/0248673 A1 * | 10/2011 | Aerts ...................... H02J 7/025 320/108 |
| 2011/0250837 A1 | 10/2011 | Hwang et al. |
| 2011/0255702 A1 | 10/2011 | Jensen |
| 2011/0300801 A1 * | 12/2011 | Kerselaers ........... H04B 5/0087 455/41.1 |
| 2012/0032778 A1 | 2/2012 | Nakano et al. |
| 2012/0306714 A1 | 12/2012 | Yosui et al. |
| 2013/0002517 A1 | 1/2013 | Pascolini et al. |
| 2013/0113662 A1 | 5/2013 | Kato et al. |
| 2013/0148828 A1 | 6/2013 | Fort |
| 2013/0171933 A1 | 7/2013 | Rofougaran |
| 2013/0278470 A1 | 10/2013 | Kataoka |
| 2013/0308805 A1 | 11/2013 | Ozden |
| 2013/0339025 A1 | 12/2013 | Suhami |
| 2014/0008446 A1 | 1/2014 | Carr |
| 2014/0023216 A1 * | 1/2014 | Solum .................. H04R 25/554 381/315 |
| 2014/0049440 A1 * | 2/2014 | Ueki ........................ H01Q 1/36 343/852 |
| 2014/0062212 A1 | 3/2014 | Sun et al. |
| 2014/0184462 A1 | 7/2014 | Kuniaki |
| 2014/0213184 A1 | 7/2014 | Matsubara |
| 2014/0241555 A1 | 8/2014 | Terlizzi |
| 2014/0315486 A1 | 10/2014 | Broyde et al. |
| 2014/0320369 A1 | 10/2014 | Azenui et al. |
| 2014/0340032 A1 | 11/2014 | Curtis |
| 2015/0001956 A1 | 1/2015 | Saen |
| 2015/0028690 A1 | 1/2015 | Sako |
| 2015/0038075 A1 | 2/2015 | Kataoka |
| 2015/0038864 A1 | 2/2015 | Kataoka et al. |
| 2015/0048985 A1 | 2/2015 | Park et al. |
| 2015/0061587 A1 | 3/2015 | Bruechmann |
| 2015/0079902 A1 | 3/2015 | Dhayni |
| 2015/0092962 A1 | 4/2015 | Amento |
| 2015/0097442 A1 | 4/2015 | Muurinen |
| 2015/0130465 A1 | 5/2015 | Wiggins et al. |
| 2015/0318603 A1 | 11/2015 | Kerselaers et al. |
| 2015/0318896 A1 | 11/2015 | Kerselaers et al. |
| 2015/0318932 A1 | 11/2015 | Kerselaers et al. |
| 2015/0319545 A1 | 11/2015 | Kerselaers et al. |
| 2015/0351292 A1 | 12/2015 | Chang et al. |
| 2016/0189860 A1 | 6/2016 | Konanur et al. |
| 2017/0125883 A1 | 5/2017 | Tenno |

FOREIGN PATENT DOCUMENTS

| | | |
|---|---|---|
| CN | 103024621 A1 | 4/2013 |
| KR | 101584555 B1 | 1/2016 |
| WO | WO03030991 A1 | 4/2003 |
| WO | WO2013183575 | 12/2013 |

OTHER PUBLICATIONS

Vladimir Utkin, Free Energy: Nikola Tesla Secrets for Everybody, Jan. 5, 2013, www.free-energy-info.com/Utkin.htm, pp. 6-8.*
Kado, et al., "RedTacton Near-body Electric-field Communications Technology and Its Applications", NTT Technical Review, vol. 8,

(56) References Cited

OTHER PUBLICATIONS

No. 3; NTT Microsystems Integration Laboratories, Atsugi-shi, JP;, Mar. 2010, pp. 1-6.
Chandrasekar, et al., Inductively Coupled Connectors and Sockets for Multi-Gb/s Pulse Signaling, IEEE Transactions on Advanced Packaging, IEEE Service Center, Piscataway, NJ, USA, vol. 31, No. 4, Nov. 1, 2008, pp. 749-758.
Ohishi, et al., Novel Pair Electrode With Coils Sensing Magnetic Energy on Human Body Surface for Intrabody Communication.
Tounsi et al., Electromagnetic Modeling of an Integrated Micromachined Inductive Microphone, Design & Technology of Integrated Systems in Nanoscalera, 2009, DTIS '09, 4th Int'l. Conf. on IEEE, Piscataway, NJ, USA, Apr. 6, 2009, pp. 38-44.
EP Communication for EP Appl. No. 15164610.6 dated Sep. 8, 2015.
Non Final Office Action dated Aug. 26, 2016 for U.S. Appl. No. 14/270,013, 13 pages.
Non Final Office Action dated Jun. 29, 2016 for U.S. Appl. No. 14/551,988, 23 pages.
Final Office Action dated Aug. 27, 2015 for U.S. Appl. No. 14/270,013, 17 pages.
International Search Report and Written Opinion dated Jul. 13, 2015 for PCT/EP2015/058044, 11 pages.
Non-Final Office Action dated Feb. 29, 2016 for U.S. Appl. No. 14/270,013, 11 pages.
Non-Final Office Action dated May 7, 2015 for U.S. Appl. No. 14/270,013, 12 pages.
International Search Report and Written Opinion dated Jul. 17, 2015 for PCT/EP2015/058052, 9 pages.
Notice of Allowance dated Jul. 21, 2015 for U.S. Appl. No. 14/302,791, 9 pages.
International Search Report and Written Opinion dated Jul. 7, 2015 for PCT/EP2015/058071, 11 pages.
U.S. Appl. No. 14/551,988 filed Nov. 24, 2014, entitled "Electromagnetic Field Induction for Inter-Body and Transverse Body Communication".
European Search Report dated Aug. 31, 2015 for EP 15164678, 6 pages.
Final Office Action dated Mar. 7, 2016 for U.S. Appl. No. 14/576,030, 13 pages.
Non-Final Office Action dated Oct. 5, 2015 for U.S Appl. No. 14/576,030, 17 pages.
European Search Report dated Aug. 31, 2015 for EP 15164622, 6 pages.
Final Office Action dated Feb. 25, 2016 for U.S. Appl. No. 14/576,583, 13 pages.
Non-Final Office Action dated Sep. 21, 2015 for U.S. Appl. No. 14/576,583, 17 pages.
European Search Report dated Aug. 31, 2015 for EP 15164621, 8 pages.
Non-Final Office Action dated Oct. 5, 2015 for U.S. Appl. No. 14/569,024, 14 pages.
Final Office Action dated Feb. 25, 2016 for U.S. Appl. No. 14/569,024, 13 pages.
U.S. Appl. No. 14/836,681 filed Aug. 26, 2015, entitled "Antenna System".
U.S. Appl. No. 15/146,665, filed May 4, 2016, entitled "Near-Field Electromagnetic Induction (NFEMI) Antenna".
Cho, N. et al., "A Planar MICS Band Antenna Combined with a Body Channel Communication Electrode for Body Sensor Network," IEEE Transactions on Microwave Theory and Techniques, vol. 57, No. 10; Oct. 2009; pp. 2515-2522.
Shinagawa, M. et al., "A Near-Field-Sensing Transceiver for Intra-Body Communication Based on the Electro-Optic Effect," Instrumentation and Measurement Technology Conference, Vail, CO; May 20-22, 2003; 6 pages.
Zimmerman, T.G., "Personal Area Networks (PAN): Near-Field Intra-Body Communication," Massachusetts Institute of Technology, Jun. 1995, 81 pages.
Non-Final Office Action for U.S. Appl. No. 14/576,583, dated Nov. 3, 2016, 33 pages.
Non-Final Office Action dated Jan. 25, 2017 for U.S. Appl. No. 14/569,024, 51 pages.
Notice of Allowance dated Jun. 7, 2017 for U.S. Appl. No. 14/551,988, 25 pages.
Non-Final Office Action dated Jan. 19, 2017 for U.S. Appl. No. 14/551,988, 21 pages.
Non-Final Office Action dated Jan. 3, 2017 for U.S. Appl. No. 14/576,030, 39 pages.
Final Office Action dated Mar. 14, 2017 for U.S. Appl. No. 14/270,013, 37 pages.
Notice of Allowance dated Jun. 14, 2017 for U.S. Appl. No. 14/836,681, 14 pages.
Non-Final Office Action dated Dec. 7, 2017 for U.S. Appl. No. 14/270,013, 41 pages.
Notice of Allowance dated Jun. 27, 2017 for U.S. Appl. No. 14/576,030, 30 pages.
Notice of Allownace dated Jun. 21, 2017 for U.S. Appl. No. 14/576,583, 34 pages.
Final Office Action dated Aug. 9, 2017 for U.S. Appl. No. 14/569,024, 52 pages.
Notice of Allowance dated Mar. 13, 2018 for U.S. Appl. No. 14/569,024, 15 pages.
Notice of Allowance dated Apr. 25, 2018 for U.S. Appl. No. 14/270,013, 19 pages.
Non Final Office Action dated May 24, 2018 for U.S. Appl. No. 15/146,685, 96 pages.

\* cited by examiner

BODY ANTENNA SYSTEM

This application is a continuation-in-part of application Ser. No. 14/270,013, filed on May 5, 2014, which is hereby incorporated by reference for all purposes as if fully set forth herein. This application is also a continuation-in-part of application Ser. No. 14/302,791, filed on Jun. 12, 2014, which is hereby incorporated by reference for all purposes as if fully set forth herein.

TECHNICAL FIELD

Various exemplary embodiments disclosed herein relate generally to an electromagnetic induction radio.

BACKGROUND

There exist a variety of wireless systems which, illustratively, are used for short range distance communication. Some systems are used for communication around the human body; other systems may be used for communication in or around other objects. For example, currently RF based hearing aids are considered for wireless communication. Often such hearing aid systems operate in the 2.4 GHz ISM band. Such systems feature propagation by means of transversal waves, the magnetic and electric fields being in phase and covering a relatively large range of perhaps 30 meters. The large range may cause problems in terms of security of the communication content and may cause interference. Furthermore, because of their relatively high frequency of operation, such systems are heavily influenced by the human body. Somewhat more conventional hearing aids employ magnetic field induction as a wireless communication method. Unfortunately, magnetic field induction based wireless systems have a limited range if the antenna is comparatively small, such as would be required in a hearing aid. Not all parts of the human body can be reached with magnetic field induction-based systems with small antennas. Consequently, it can be difficult to provide communication between a hearing aid and a hand-held control using such systems.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to an electromagnetic induction wireless communication system including: a magnetic antenna; an electric antenna; a tuning capacitor coupled to the magnetic antenna configured to tune the magnetic antenna; a controller configured to control the operation of the communication system; a signal source coupled to the controller configured to produce a communication signal used to drive the magnetic antenna and the electric antenna; a voltage control unit coupled to the signal source configured to produce one of an amplitude difference, phase difference, and an amplitude and a phase difference between the communication signal used to drive the magnetic antenna and electric antenna.

Further, various exemplary embodiments relate to an electromagnetic induction antenna including: a capacitor having a first plate and a second plate spaced apart from the first plate; and an inductor including windings surrounding the first plate; wherein the capacitor and inductor are electrically connected, wherein the capacitor is an electric field antenna, and wherein the inductor is a magnetic field antenna.

Further, various exemplary embodiments relate to an electromagnetic induction antenna including: a first inductor including windings; a second inductor including windings spaced apart from the first inductor; and an impedance connecting the first and second inductors; wherein the first and second inductor form a capacitor; wherein the capacitor is an electric field antenna, and wherein the inductor is a magnetic field antenna.

Further, various exemplary embodiments relate to an electromagnetic induction wireless transceiver including: a magnetic antenna; and a signal source configured to produce a communication signal used to drive the magnetic antenna to produce electromagnetic induction fields, wherein the transceiver when connected to a first location on a body is configured to communicate with another electromagnetic induction wireless transceiver connected to a second location on the body.

Further, various exemplary embodiments relate to an electromagnetic induction wireless transceiver including: a magnetic antenna configured to receive an electromagnetic induction field, the magnetic antenna being connectable to a body; and a receiver configured to receive a communication signal carried by the electromagnetic induction fields, wherein the transceiver when connected to a first location on the body is configured to communicate with another electromagnetic induction wireless transceiver connected to a second location on the body Further, various exemplary embodiments relate to an

BRIEF DESCRIPTION OF THE DRAWINGS

In order to better understand various exemplary embodiments, reference is made to the accompanying drawings, wherein:

FIG. 16 illustrates a front view of a hearing aid H including the body antenna AS;

To facilitate understanding, identical reference numerals have been used to designate elements having substantially the same or similar structure and/or substantially the same or similar function.

DETAILED DESCRIPTION

Figure 1:
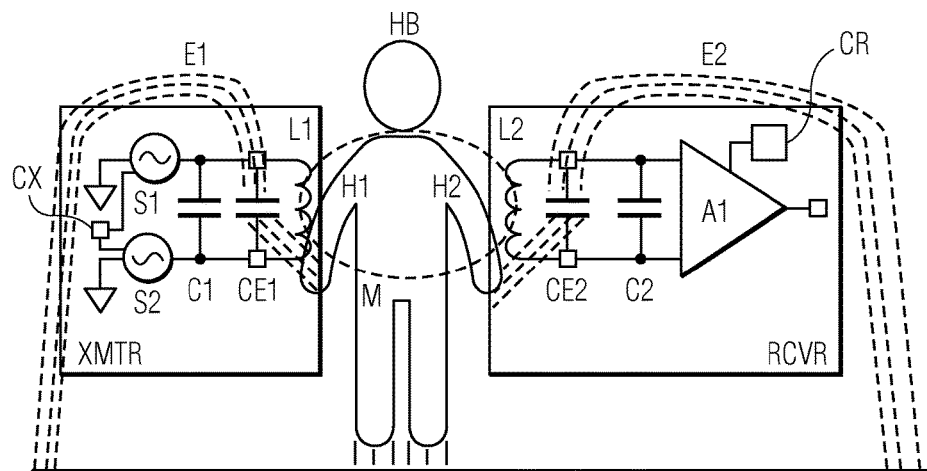
FIG. 1 illustrates a block diagram of wireless communication system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

An electromagnetic induction radio described herein improves the link budget and extends the communication range. The link budget is defined as, $$\text{Link budget [dB]} = 20 \; \log 10\left(\frac{V_{Rx}}{V_{Tx}}\right),$$

where VTx is the transmitter voltage on the transmitter antennas and VRx is the received voltage on the receiver antennas.

In a related U.S. patent application Ser. No. 14/270,013 entitled "ELECTROMAGNETIC INDUCTION FIELD COMMUNICATION" filed on May 5, 2014 an electromagnetic communication method near a living body by means of a combination of a magnetic field and electric field with no intention to form transversal radiating waves is described. This results in a method that improves the link budget and extends the range to the complete living body and enables communication between devices near living bodies, including a first device connected to a first body and a second device connected to a second body such that the first device communicates with the second device, wherein the first and second bodies are connected through magnetic and electric near-field coupling. Even communication between more than two bodies is possible, but the embodiments described herein will use two living bodies for simplicity. Multiple devices with transceivers are also possible, but the embodiments described herein will use two devices or transceivers for simplicity.

The magnetic field is generated by a current through a first coil. The electric field can be generated by a first coupling capacitor, having a first conducting plate coupled to the body and a second conducting plate coupled to the environment. The wireless communication system is not galvanically connected to the ground. The magnetic and electric field can be received by a receiver at another place near the body by means of a second coil and a second coupling capacitor, the second capacitor having a first conducting plate coupled to the body and a second conducting plate coupled to the environment.

Figure 2:
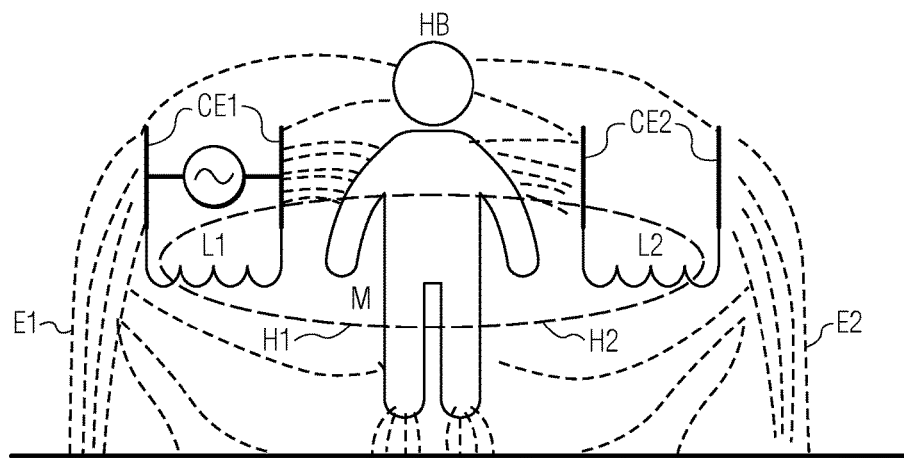
FIG. 2 illustrates a diagram of electrical and magnetic field lines during operation of the wireless communication system.

FIG. 1 illustrates a block diagram of the wireless communication system. FIG. 2 illustrates a diagram of electrical and magnetic field lines during operation of the wireless communication system. The wireless communication system of FIG. 1 includes a transmitter XMTR and receiver RCVR. Communication between transmitter XMTR and receiver RCVR is accomplished via a combination of an electric field and a magnetic field as will be further described. The transmitter XMTR and receiver RCVR are spaced apart from the human body HB by an exaggerated distance so that the electric field may be shown. The human body may be replaced by any other living body in FIG. 1, FIG. 2 and FIG. 3. Magnetic field H1 is generated by current through coil L1. An electric field E1 can be generated by a voltage on coupling capacitor CE1. Coupling capacitor CE1 has a first conducting plate coupled to the human body HB and a second conducting plate coupled to the environment as will be further illustrated below. Capacitors C1 and C2 are provided to resonate their respective circuits at the required operational frequency.

Magnetic field H1 and electric field E1 may be generated by the same voltage using sources S1 and S2. Accordingly, the sources S1 and S2 produce the communication signal to be transmitted. In this illustrative embodiment the sources S1 and S2 may generate a balanced voltage across the coil L1. However the voltage across the coil L1 may also be unbalanced and in this case only one source is required.

Magnetic field H2 and electric field E2 (which have different amplitudes than magnetic field H1 and electric field E1 respectively) may be received at a receiver RCVR positioned at another place near the human body (perhaps in the other ear) by means of a coil L2 and a coupling capacitor CE2. A signal detector A1 detects the signal received by the RCVR. Coupling capacitor CE2 has a first conducting plate coupled to the human body HB and a second conducting plate coupled to the environment as will be further illustrated in FIG. 3. Further, coils L1 and L2 have a mutual inductance M.

FIG. 1 shows an illustrative embodiment of a transmitter XMTR and receiver RCVR that allows uni-directional communication. In another embodiment, both XMTR and RCVR may be also transceivers and bi-directional communication is thus made possible.

Not illustrated in detail are the driving circuitry, signal processing circuitry, microphones, control circuitry, etc., although such items may be viewed as embodied in blocks denoted by CX or CR in FIG. 1.

This wireless communication system communicates using a wireless electromagnetic field communication method near a human body. The electromagnetic induction fields are a combination of a magnetic field H1 and electric field E1 with no intention to form transversal radiating waves. The magnetic field H1 is generated by a magnetic antenna, a coil L1, while the electric field E1 is generated by a voltage on a coupling capacitor CE1. This coupling capacitor CE1 has a first conducting plate P11 coupled to the human body HB and a second conducting plate P12 coupled to the environment. The wireless system, including the transmitter XMTR and receiver RCVR, is not galvanically connected to the ground. It will be noted that the electric field lines E1 and E2 extend down the length of the human body HB.

A combination of a magnetic field and an electric field is created, and the electric field is present between the living body and the environment. The magnetic induction field decreases with 60 db per decade distance from the source in air, however the electric induction field decreases with less than 60 db per decade of the distance from the source.

The magnetic field H2 and electric field E2 can be received by a receiver at another place near the human body by means of a coil L2 and a coupling capacitor CE2, the coupling capacitor CE2 having a first conducting plate P21 coupled to the human body and a second conducting plate P22 to the environment.

In the embodiments discussed, the coils and coupling capacitors are so small that (i.e. less than about 5% of the wavelength of the electric E1 and E2 and magnetic H1 and H2 fields), that there is not significant generation of undesired transverse radiating waves.

Figure 3:
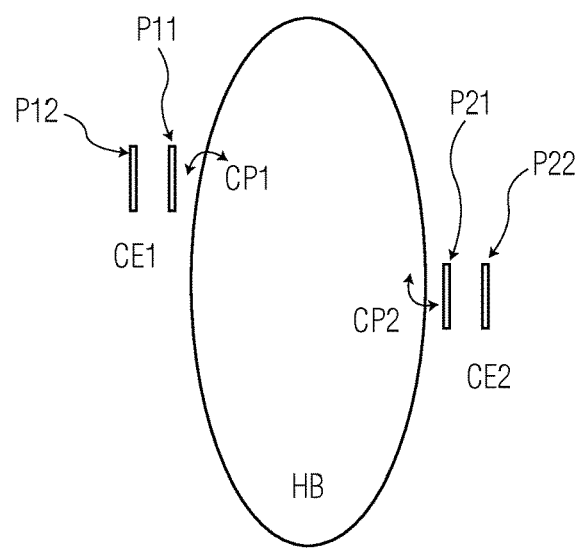
FIG. 3 illustrates the coupling capacitors CE1 and CE2 near a human body.

In an embodiment, coils L1 and L2 are unscreened and smaller (ideally much smaller) than the chosen wavelength of operation. The capacitors CE1 and CE2 each have one conducting surface, i.e., P11 and P22 in FIG. 3, which is close to or in contact with a body, illustratively, a human body HB. The opposing surfaces, i.e., plates P12 and P22 of FIG. 3 are closer to the environment than the human body HB, and the size of the plates are smaller (ideally much smaller) than the chosen wavelength of operation. Plates P12 and P11 are preferably parallel and have the same shape, but it is also permissible that the plates are of different size and only partially parallel (i.e. somewhat non-parallel) or side by side. The same is true for plates P21 and P22.

FIG. 3 illustrates the coupling capacitors CE1 and CE2 near a human body HB. The conductive plate P11 of coupling capacitor CE1 is coupled with the human body HB. The conductive plate P12 of coupling capacitor CE1 is coupled to the environment. The conductive plate P21 of coupling capacitor CE2 is coupled with the human body HB at another position. The conductive plate P22 of coupling capacitor CE2 is coupled to the environment. CE1 has a coupling factor CP1, and CE2 has a coupling factor CP2. The coupling factor CP1 and CP2 play a role in the link budget of the communication system.

Plates P11, P12, P21, and P22 may be made from conductive material, for example metal. In general, plates P11, P12, P21, and P22 may have a variety of shapes and may be surrounded by dielectric material so that the overall structure of CE1 and CE2 performs a capacitive function. In general, the dimensions of capacitors CE1 and CE2 should be small relative to the wavelength of operation.

However different applications may require a composition of electric and magnetic fields of different amplitudes and phase between them. Therefore a system is described below that may be integrated in a RF integrated circuit and that is suitable to generate a blending of field amplitudes and phase that may be programmed to be specifically suited for various applications. The blending can be continuously adaptable. In order to understand the effects of different amplitudes and phases between the electric and magnetic fields various tests and measurements were done. The results of these tests are discussed below and provide insight as to the benefits of varying the amplitudes and phases between the electric and magnetic fields.

By way of an example embodiment, if capacitors CE1 and CE2 are approximately 10 pF in value (which is somewhat defined by coupling capacitor design), while coils L1 and L2 are be approximately 3.7 µH, then some extra capacitance may be required to tune the circuit to the desired operational frequency, for example 10.6 MHz. Consequently the values of capacitors C1 and C2 are approximately 50.96 pF. In an embodiment, capacitors C1 and C2 are a capacitor bank which may be integrated into an RF integrated circuit that is adjustable to resonate at the required frequency. The adjustability compensates for the added capacitance due to the human body.

From measurements it was found that the link budget for the electromagnetic induction system can be changed. Different link budget values can be obtained by means of varying the phase and amplitude of the magnetic and the electric field that is generated by the wireless communication system. Thus a system that varies the amplitude and phase of the voltage applied to the coil antenna and the capacitor antenna may be used to improve the performance of the wireless communication system.

Figure 4:
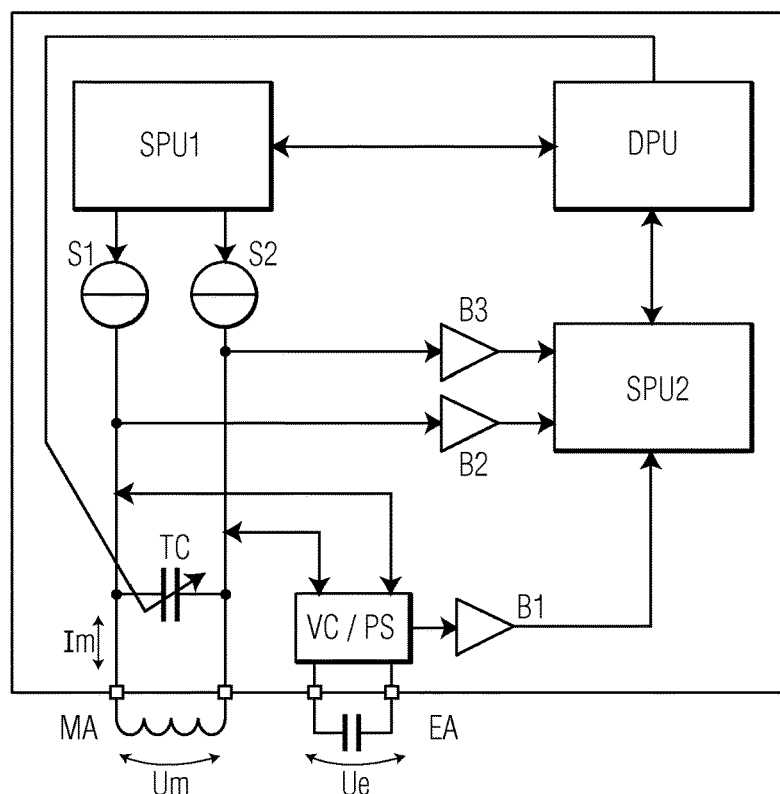
FIG. 4 illustrates block diagram of an embodiment of an electromagnetic induction radio.

FIG. 4 illustrates block diagram of an embodiment of an electromagnetic induction radio. The electromagnetic induction radio (EIR) may include a digital processing unit DPU, signal processing units SPU1 and SPU2, signal generators S1 and S2, buffers B1, B2, and B3, a tuning capacitor TC, a voltage processing unit VC/PS, an magnetic antenna coil MA, and an electric antenna capacitor EA.

The digital processing unit DPU may control the operation of the EIR and processes the signals related to the communication. The digital processing unit may contain analog digital converters (ADC) and/or digital analog converters (DAC), memory, storage, and all the hardware and software required to process the communication signals. The digital processing unit may include a processor that may be any hardware device capable of executing instructions stored in a memory or other storage or otherwise processing data. As such, the processor may include a microprocessor, field programmable gate array (FPGA), application-specific integrated circuit (ASIC), or other similar devices. The memory may include various memories such as cache or system memory. As such, the memory may include static random access memory (SRAM), dynamic RAM (DRAM), flash memory, read only memory (ROM), or other similar memory devices. The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. For example, the storage may store a base operating system for controlling various basic operations of the hardware. It may also store data received and processed by the EIR. Also, the storage my include instructions used to process the data received by the EIR.

Signal processing units SPU1 and SPU2 may contain the required hardware to interface to the antenna circuitry MA and EA and the digital processing unit DPU. SPU1 and SPU2 may include a processor that may be any hardware device capable of executing instructions stored in a memory or other storage or otherwise processing data. As such, the processor may include a microprocessor, a signal processor, graphics processor, field programmable gate array (FPGA), application-specific integrated circuit (ASIC), or other similar devices. The signal processing unit SPU1 may help implement the transmitter function while the signal processing unit SPU2 may help implement the receiver function. In such a case the EIR may have a transceiver functionality and thus may be able to perform bidirectional communication.

In a transmitter mode, the magnetic field Um is generated by a first alternating current $I_m$ through a magnetic antenna, coil MA, while the electric field Ue is generated by a second alternating voltage $V_e$ on the electric antenna capacitor EA. The current $I_m$ through the coil MA is dependent on the voltage on the coil:

$$I_m = V_m / Z_{coil},$$

$$Z_{coil} = 2\pi f L_{coil}$$

The two voltages $V_m$ and $V_e$ thus define the magnetic and electric fields Um and Ue respectively. Changing one of the amplitudes of $V_m$ and $V_e$ or the phase between them, changes the combination of the magnetic field Um and electric field Ue and thus blending of the fields may be done in order to improve the performance of the wireless communication system.

Signal processing unit SPU1 may command signal generators S1 and S2 to produce currents that drive the resonating circuit formed by coil MA and tuning capacitor TC. Accordingly, the sources S1 and S2 produce the communication signal to be transmitted. In this illustrative embodiment the sources S1 and S2 may generate a balanced voltage across MA. However the voltage across MA may also be unbalanced and in this case only one source is required. TC is an integrated capacitor bank that may be adjusted by the digital processing unit DPU to tune the receiver/transmitter. The resonating frequency can be chosen in one of the industrial, scientific, and medical (ISM) bands, for example 10.6 MHz. The resonating circuit may have a bandwidth that is sufficient for the required communication mode data rate. Optionally the bandwidth may be adapted by means of inserting additional loss in the resonating circuit using, for example, a resistor bank which may have an adjustable resistance. This may be an additional functional block in the EIR.

The voltage $V_m$ on the magnetic antenna MA is processed in the voltage processing unit VC/PS and further applied to the electric antenna EA. The VC/PS produces a voltage $V_e$ that is applied to the electric antenna EA. The VC/PS may reduce or increase the input voltage $V_e$ relative to $V_m$. The VC/PS may additionally also change the phase between $V_m$ and $V_e$. In this way the composition of magnetic and electric fields may be changed according to the needs of the application. Alternatively the voltage Ve that is applied to the electric antenna EA is processed in the voltage processing unit VC/PS and further applied to the magnetic antenna MA. The VC/PS produces a voltage Vm that is applied to the magnetic antenna MA. The VC/PS may reduce or increase the input voltage $V_m$ relative to $V_e$. The VC/PS may additionally also change the phase between $V_e$ and $V_m$. In this way the composition of magnetic and electric fields may be changed according to the needs of the application.

In the receive mode the voltage received by the magnetic antenna MA may be combined with the voltage received by the electric antenna EA. Before combining both signals the phase and/or amplitude between them may be adapted.

For example, when both signals are combined in a parallel tuned circuit, the amplitude of the induced antenna voltages should have a 180 degree phase shift between them to generate an optimal combined output signal. This may not always be desirable for all applications due to antenna design and positioning at the human body. Moreover the phase between them may change dynamically and the VC/PS may continuously respond to such changes.

The signal processing unit SPU2 may process the received voltages from the antennas MA and EA. It is noted that the VC/PS may have bidirectional functionality. The signal at the resonating circuit formed by TC and MA may be buffered by buffers B2 and B3. An additional buffer B1 may be available to monitor the difference between received magnetic and electric field strength. Alternatively, the receiver and transmitter can also have separate receive and transmit VC/PS.

The DPU may adjust the amplitude and phase characteristics between the electric and magnetic fields used to implement communication between a transmitter and a receiver. Information regarding the communication environment may be based upon various collected test data. Also, test measurements may be made for each individual user of the communication system. Further, various channel measurement signals may be included as part of the communication signal in order to determine variations in the communication channel during the operation of the wireless communication system. These channel measurements may then be used to adjust the phase and amplitude between the magnetic and electric fields. Further, feedback loops may be used to further monitor and adjust the phase and amplitude of between the magnetic and electric signals.

The EIR may be implemented as a combination of different integrated circuits (ICs) or on a single IC. Further, the DPU, SPU1, and SPU2 are shown as separate physical and functional blocks in FIG. 4, but the DPU, SPU1, and the SPU2 may be implemented in a single processor which may be its own IC. Also, SPU1 and SPU2 may be implemented on a single signal processing unit which may be its own IC. The DPU or the combination of the DPU, SPU1, and SPU2 may be called a controller that controls the operation of the EIR.

Figure 5:
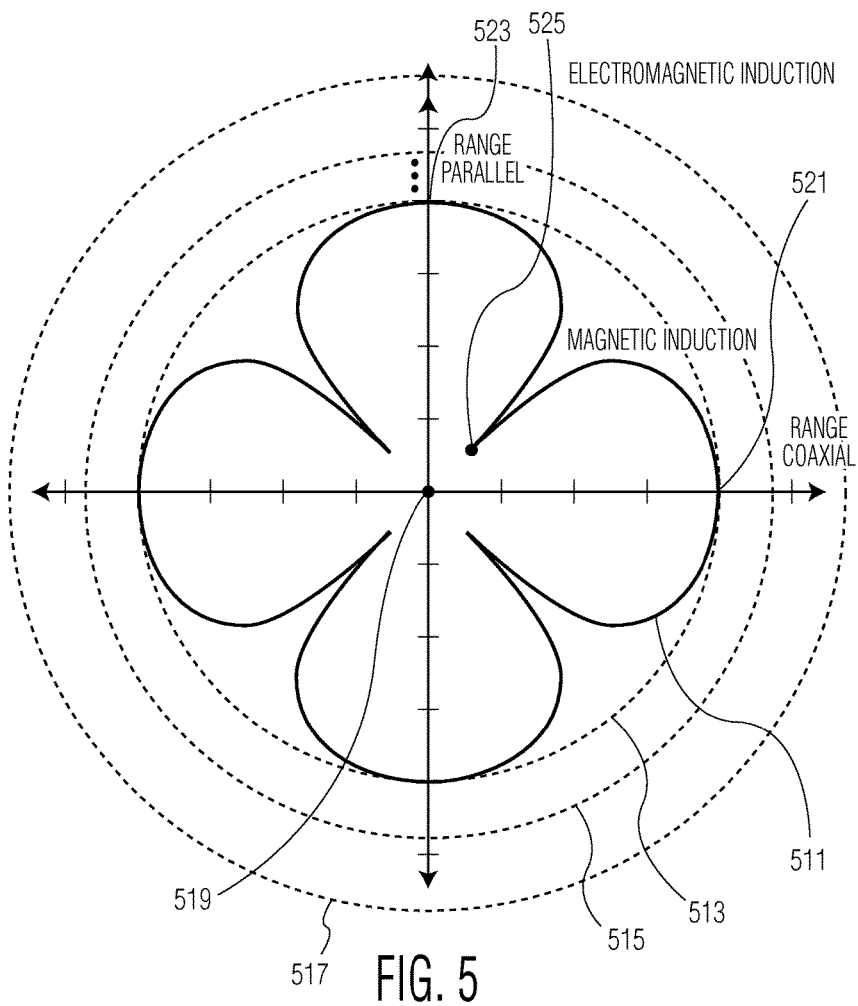
FIG. 5 is a diagram illustrating comparative ranges of a communication system which uses magnetic field induction and a communication system using electromagnetic field induction.

FIG. 5 is a diagram illustrating comparative ranges of a communication system which uses magnetic field induction and a communication system. In FIG. 5, the horizontal axis indicates directivity when coils L1 and L2 are coaxial; the vertical axis indicates directivity when coils L1 and L2 are parallel. The directivity in case of a link using the magnetic field induction method is illustrated by line 511. It will be noted that the range drops significantly when moving from the case where both coils are coaxial to the case where coils are parallel. Using the diagram of FIG. 5, if the transmit coil L1 of FIG. 1 were located at the origin 519 of FIG. 5, one can see that the receiver coil L2 can be placed in either location 521 or 523 (which correspond, respectively, to a coaxial orientation with respect to the transmitter coil L1 or a parallel orientation with respect to transmitter coil L1) and best-case detection of the magnetic field generated by transmit coil L1 will be achieved. However, if the receiver coil L2 is positioned along a line which is oriented at forty five degrees between locations 521 and 523, (i.e. at location 525), the receiver coil must be placed substantially closer to the transmitter coil L1 for adequate detection to occur. The disclosed embodiment, however exhibits a more omnidirectional range profile and possibly greater range. The omnidirectional profile and possibly greater range in case of a link using electromagnetic induction fields facilitate more robust communication.

Figure 6:
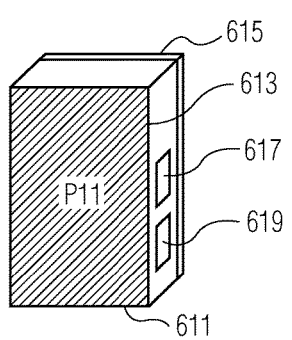
FIG. 6 depicts a control and/or display unit.

In another embodiment, there may be a separate control and/or display unit. FIG. 6 depicts a control and/or display unit 611. Control and/or display unit 611 has two plates 613 and 615 on opposite sides. Control and/or display unit 611 may be held in the hand of a user. One of the plates, 613 or 615 will be held more securely in the hand than the other and will therefore be more strongly coupled to the user's body, while the other plate will have a somewhat stronger coupling to the environment. Control and/or display unit 611 is capable of communicating with transmitter XMTR or receiver RCVR. Illustratively, control and/or display unit may, in combination, or individually, provide: volume control; noise reduction control; human body parameters such as heart rate, and other items such as physical parameters monitored around the body. Operation of the control and/or display unit is facilitated by the electromagnetic induction fields. In an embodiment, dimensioning and parallelism are similar to that described for plates P12 and P22 above. Control and/or display unit may have a display, and internal circuitry, 619, similar to either transmitter XMTR or receiver RCVR (or may have internal circuitry which is a transceiver as previously described).

Now embodiments of antennas that may be used with in the EIR will be described.

As described above, many wireless communications occur in the far-field region, where information is transferred through the radiation of electromagnetic waves. While radiating electromagnetic waves in the far-field sufficiently address the need for communication over larger distances, it may not be an effective solution for short range body communication. When body communication over very short distances is required, often it is difficult to limit the electromagnetic transmitted signal to within close proximity of the transmitter.

Further, as described above, near-field communication has been seen as an efficient technique for limited range communication. The amplitude of near-field electromagnetic waves decreases faster than far-field electromagnetic waves as it travels through the channel. This results in very limited communication range.

While far-field refers to the region around a radiating antenna in which electromagnetic waves are radiated into space, the term near-field describes a region close to the transmitting antenna in which non-radiating magnetic waves exist. The boundary between the near-field and far-field region is not fixed and it changes with the operating frequency. The boundary between the near and far-field region may be defined using transmission range, wave impedance or phase variation of radiation.

Figure 7:
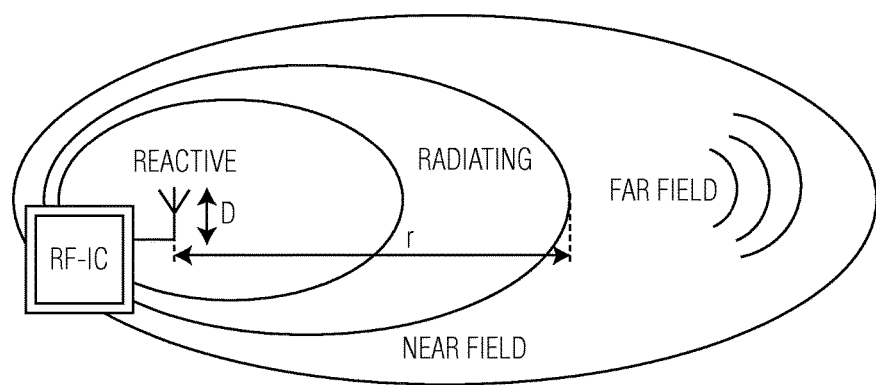
FIG. 7 illustrates how the area around an antenna is divided into different regions.

FIG. 7 illustrates how the area around an antenna is divided into different regions. The two main regions are near-field and far-field. In the far-field region, the electromagnetic waves that propagate are a combination of electric and magnetic waves. An electromagnetic wave consists of an electric field and a magnetic field, which are perpendicular to each other and also to the direction of propagation.

However, the near-field region includes two sub-regions: the reactive and radiating region. In the radiating region, the angular field distribution depends on distance, while in the reactive zone energy is stored and not radiated. The precise boundary between these two regions may be determined based on the specific application. The reactive near-field range may be defined by $r<\lambda/2\pi$, where r is range and $\lambda$, is wavelength. For example, near-field communication in the 10.6 MHz frequency range results is a reactive near-field zone of 4.5 meters. This example shows that communication on the human body at this frequency occurs in the reactive near-field by means of induction.

Communication in the near-field can occur through the use of electric field, magnetic field, or both as described above. Electric and magnetic waves have different behavior in the near-field region. One of the main differences is that there is a need for specific antenna types for data transmission using each field type. Electric field transmission occurs by using an electric antenna such as a dipole or whip while magnetic field transmission occurs by using a magnetic antenna such as a loop antenna.

Figure 8:
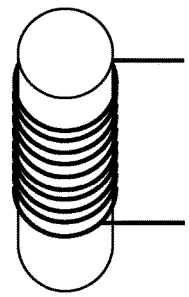
FIG. 8 illustrates a prior art magnetic antenna.

FIG. 8 illustrates a prior art magnetic antenna. This type of antenna is often used, for example, in magnetic induction based hearing aids. The generated magnetic field in transmit mode is increased by means of the ferrite core.

Figure 9:
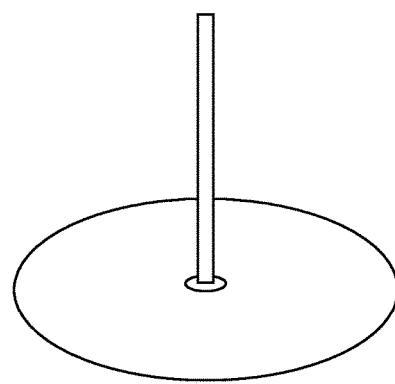
FIG. 9 illustrates a prior art electric antenna.

FIG. 9 illustrates a prior art electric antenna. This type of antenna is often used in portable applications and may include either a whip or a dipole.

Figure 10:
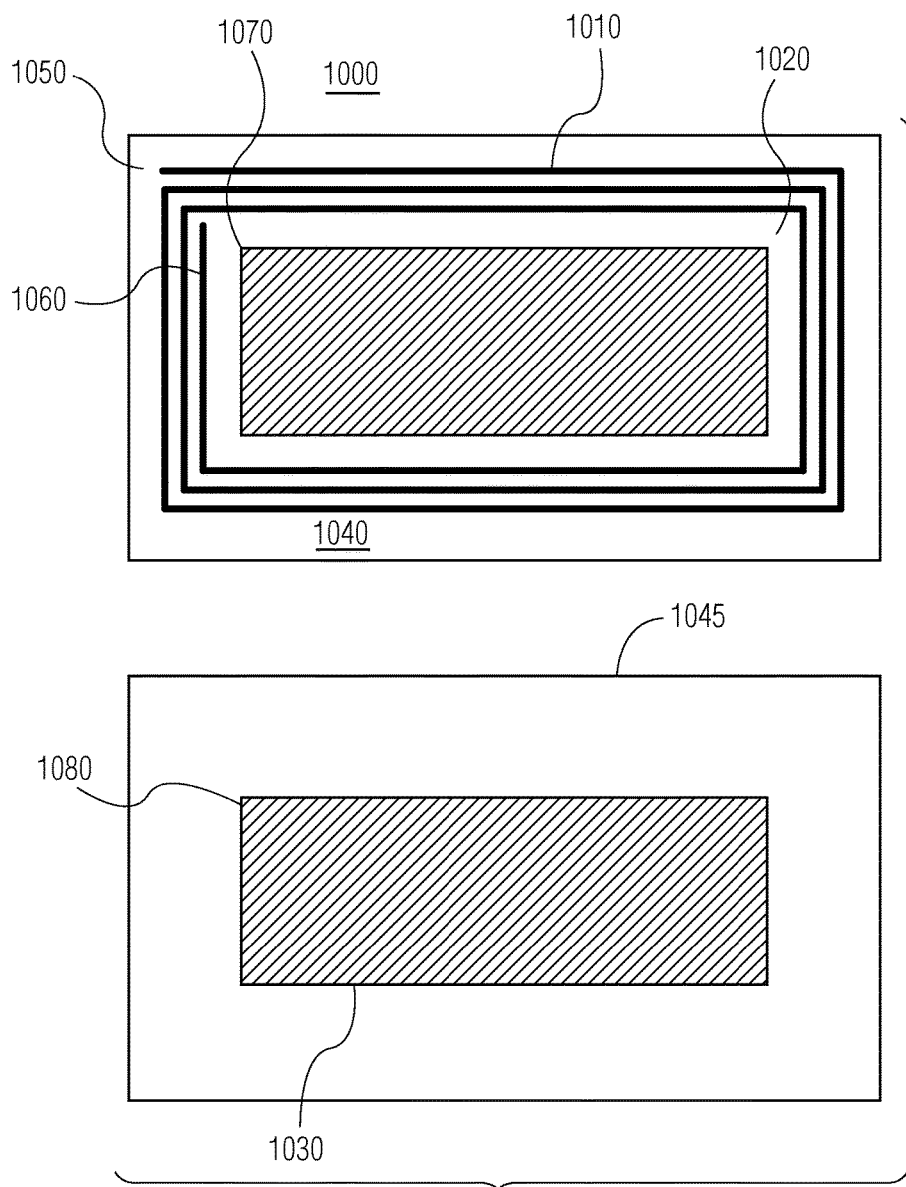
FIG. 10 illustrates a first embodiment of a body communication antenna.

FIG. 10 illustrates a first embodiment of a body communication antenna. This first embodiment of the body antenna 1000 may generate and receive electromagnetic induction fields as described above. In contrast with antennas for wireless communication that occurs in the far-field region, this body antenna 1000 is not always power matched. The body antenna 1000 may include a magnetic field generating inductor 1010 and electric field generating capacitor including capacitor plates 1020, 1030. The body antenna 1000 may be further included in a series or parallel resonant circuit as described above. Components of the antenna or resonant circuit may be part of an integrated circuit with radio functionality.

The inductor 1010 may be planar but this is not required as it may be designed to conform to the shape of a device including the body antenna 1000. The inductor 1010 includes windings that are wrapped around the capacitor plate 1020. The inductor 1010 may include two connectors 1050, 1060 that may be connected to other devices. The winding will include a conductive material. The windings may be formed using various known techniques. For example, the windings may be formed on a dielectric substrate 1040 that may be a part of the body antenna 1000. The dielectric substrate 1040 may be made of for example, paper, plastic, or some other non-conductive material.

The capacitor plates 1020, 1030 may be positioned at a specific distance from one another to form the capacitor. The capacitor plates 1020, 1030 may be planar but this is not required as the capacitor plates 1020, 1030 may be designed to conform to the shape of a device including the body antenna 1000. Both capacitor plates are electrically conductive. The capacitor plates 1020, 1030 may include connectors 1070, 1080 respectively. The inductor 1010 may be connected via connectors 1050, 1060 to the connectors 1070, 1080 of the capacitor plates 1020, 1030.

In a variation of the embodiment of the body antenna 1000 of FIG. 10, the capacitor plate 1020 may be eliminated. Then the inductor 1010 may form a capacitor along with the capacitor plate 1030. Further, the inductor 1010 may continue to wind into the center. The dimensions of the inductor 1010 may be selected to correspond to the dimensions of the capacitor plate 1030 in order to provide an adequate capacitance. Further, while the inductor and capacitor plates are shown as rectangular, they may be other shapes such as square, circular, oval, elliptical, or any other polygon.

Figure 11:
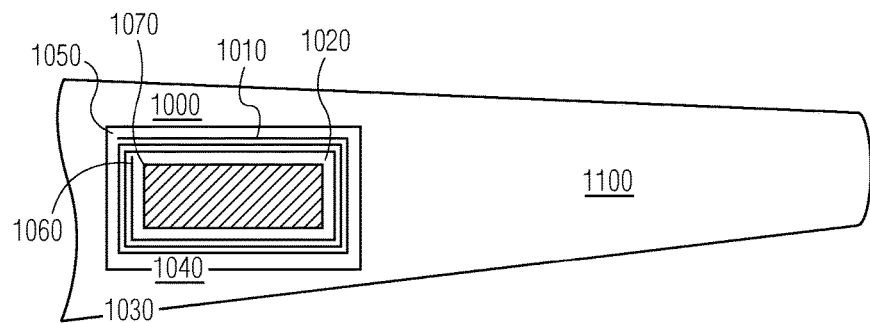
FIG. 11 illustrates the first embodiment of the body communication antenna mounted on an arm.
Figure 12:
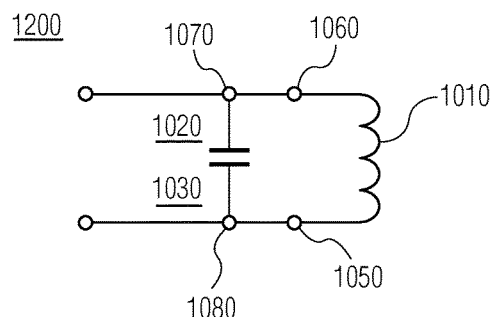
FIG. 12 illustrates a lumped model of the body antenna.

FIG. 11 illustrates the first embodiment of the body communication antenna 1000 mounted on an arm 1100. FIG. 12 illustrates a lumped model of the body antenna 1000. The inductor 1010 connections 1050, 1060 are electrically connected to the connections 1080, 1070 respectively of the capacitor plates 1020, 1030.

Figure 13:
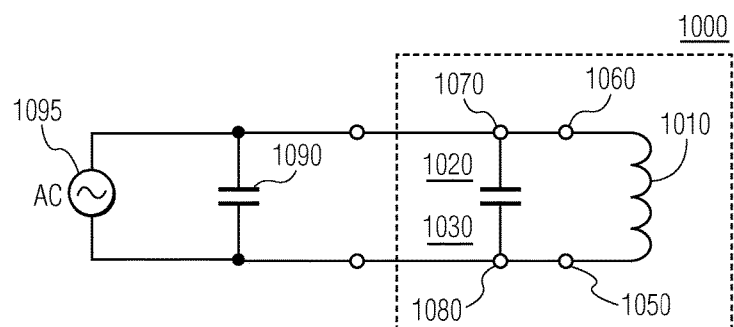
FIG. 13 illustrates the lumped model of the body antenna of FIG. 12 in a resonating transmitting circuit.

FIG. 13 illustrates the lumped model of the body antenna 1000 of FIG. 12 in a resonating transmitting circuit. A tuning capacitor 1090 and a signal source 1095 may be connected to the body antenna 1000 and causes the antenna to resonate in the required frequency band. The capacitor C2 may be an integrated capacitor bank in a RF communication integrated circuit (IC). The inductor 1010 may have inductance values in the 1-8 µH range. Further, the capacitor formed by the capacitor plates 1020, 1030 may have capacitance values 1 to 50 pF range.

Figure 14:
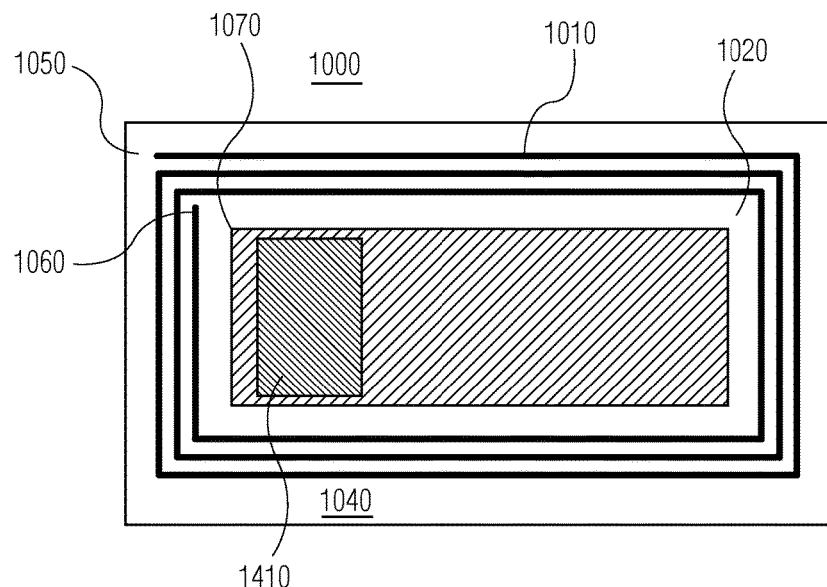
FIG. 14 illustrates a further embodiment where the body antenna may be extended with radio electronics.

FIG. 14 illustrates a further embodiment where the body antenna 1000 may be extended with radio electronics. The radio electronics 1410 may be embedded in the first plate 1020 or second plate 1030 of the capacitor. The feeding connections of the antenna are connected to the input of the radio electronics 1410.

Figure 15:
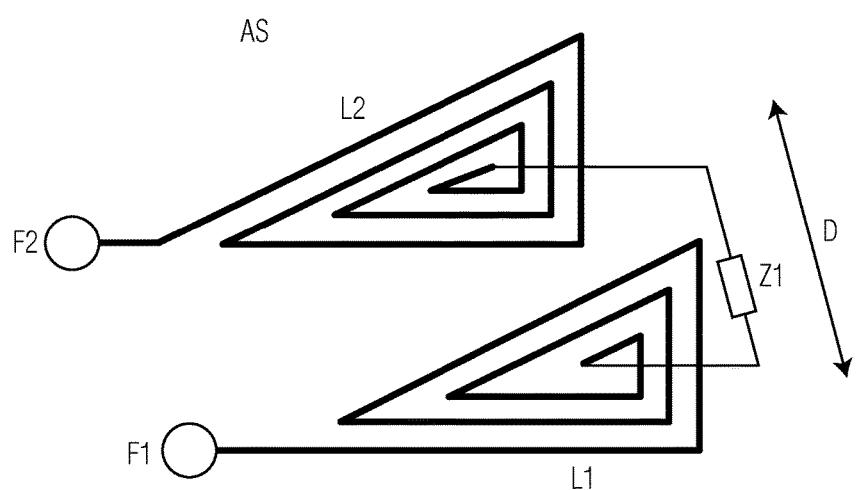
FIG. 15 illustrates a second embodiment of a body communication antenna.

FIG. 15 illustrates a second embodiment of a body communication antenna. The body antenna AS may include two coils L1 and L2 and an impedance Z1 connected between the coils L1 and L2. The two coils L1 and L2 that are a distance D separated from each other. The coils L1 and L2 may each be attached to a side of a wireless product and may follow its contours. Such contours may be flat or curved. Both coils L1 and L2 may generate or receive magnetic induction fields. The two coils L1 and L2 form inductors. The coils L1 and L2 may be formed of a conductive material using any known technique. The coils may be formed on a dielectric substrate (not shown) that may be made of for example, paper, plastic, or some other non-conducting material. The two coils L1 and L2 also form a capacitor that will be described in further detail below.

The first coil L1 is connected to the second coil L2 by means of the impedance Z1. The first coil L1 and the second coil L2 may be connected in such a way that the total inductance is the sum of the inductance of L1 and the inductance of L2, assuming the connection impedance Z1 does not include any significant inductance.

Figure 16:
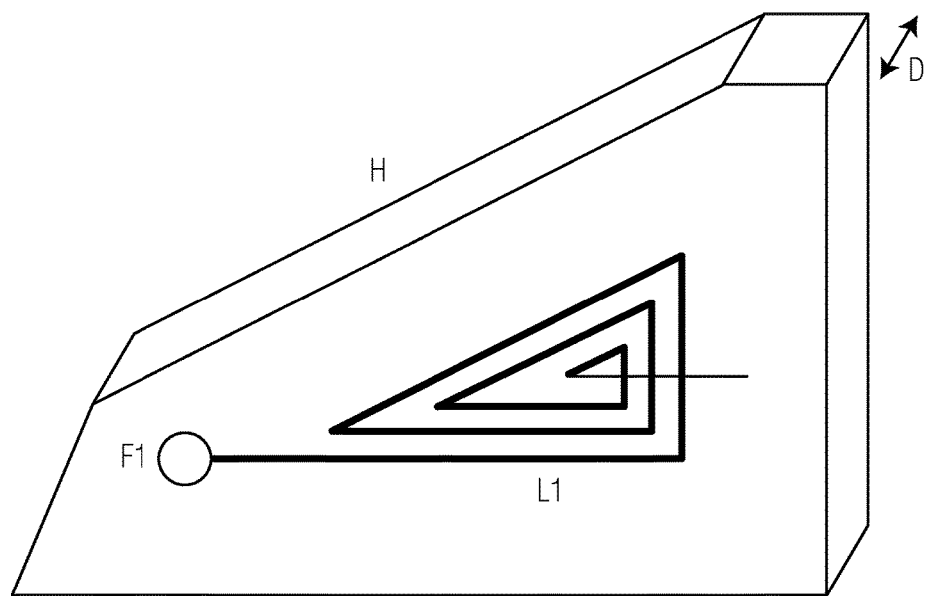

FIG. 16 illustrates a front view of a hearing aid H including the body antenna AS. The first coil L1 is attached to or formed on the front side of the hearing aid H. The second coil L2 is attached to or formed on the back side (not shown) of the hearing aid H. The separation between the two coils D is defined by the thickness of the hearing aid product H.

The attachment of the coils to the wireless product may be done using various methods. It may be by a plastic carrier having the coils or the coils may be printed with conductive material. There is no restriction as long as the coil is constructed from conductive material. The shape of the coils may be selected to fit the shape of the end product. It may follow the contour of the wireless product housing.

Figure 17:
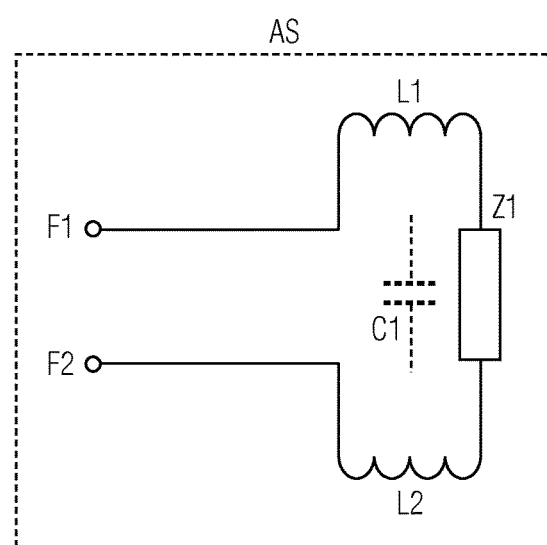
FIG. 17 illustrates a lumped model of the body antenna AS'

FIG. 17 illustrates a lumped model of the body antenna AS. The first coil L1 and the second coil L2 are connected by means of the impedance Z1 to form an effective inductor having an inductance larger than the inductance of coil L1 or L2. The connection impedance Z1 may include a discrete component and may be used to adapt the total inductance/impedance to the required value. The impedance may include resistive, capacitive, or inductive elements in any combination as needed.

Due to the physical separation D between the two coils L1 and L2, a capacitor C1 is formed. The capacitance value of the capacitor C1 may be determined as follows:

$$C = \varepsilon_0 \times \varepsilon r \times A/D,$$

where C is capacitance in farads, A is the surface area of one coil, D is the distance between the coils, $\varepsilon_0$ is the permittivity of free space, $8.854 \times 10^{-12}$ F/m, and $\varepsilon r$ is the relative permittivity of the material between the coils.

A voltage source, $V_{source}$, connected to a capacitor generates an electrical field. The electric field strength in the near field zone, in an air environment, can be found by differentiating the field potential $V_{source}$ with respect to the distance r which is defined for a dipole by:

$$V_{source} = \frac{P}{4\pi\varepsilon r^3},$$

where $V_{source}$ is the voltage across the coils, P is the dipole moment, $\varepsilon$ is the permittivity of the material between the coils, and r is the distance from the coils.

The dipole moment P is estimated by approximating the coils as a parallel plate capacitor with a distance D between the plates:

$$P = Q \times D,$$

where P is the dipole moment, Q is the charge on the coils, and D is the distance between the coils. Calculating the resulting charge Q on the coils can be done by the relationship:

$$Q = C \times V_{source}.$$

Figure 18:
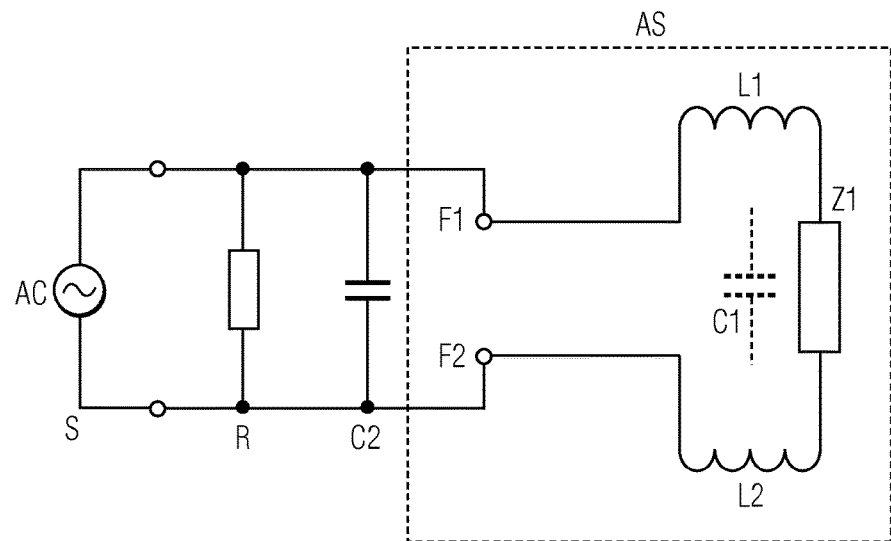
FIG. 18 illustrates the electrical equivalent model of the body antenna AS in a resonating transmitting circuit.

FIG. 18 illustrates the electrical equivalent model of the body antenna AS in a resonating transmitting circuit. The tuning capacitor C2 value connected to the body antenna AS causes the antenna to resonate in the required frequency band. The capacitor C2 may be an integrated capacitor bank in a RF communication IC. The value of the resistor R may be selected so that the required bandwidth of the resonating circuit results in high quality communication. The resistor R may be an integrated resistor bank in a RF communication IC.

Figure 19:
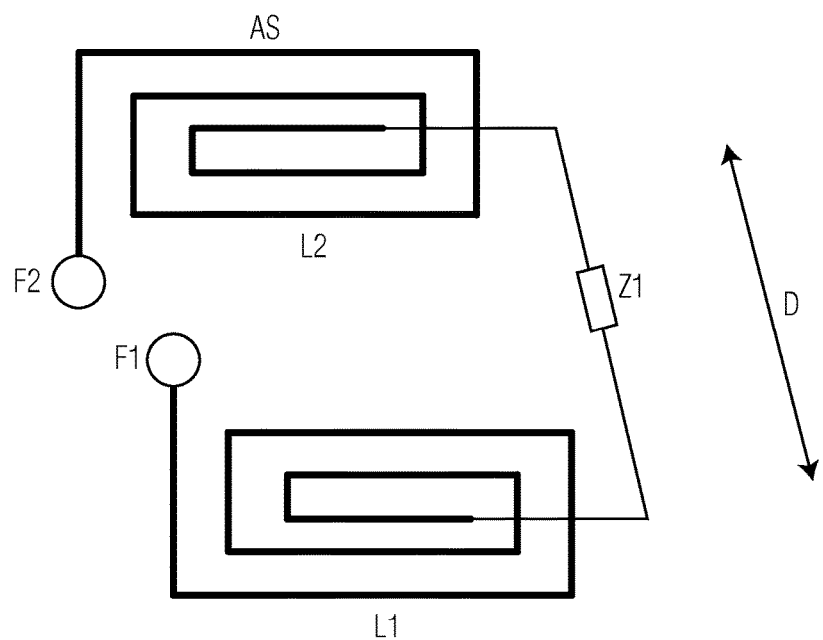
FIG. 19 illustrates another embodiment of the body antenna.
Figure 20:
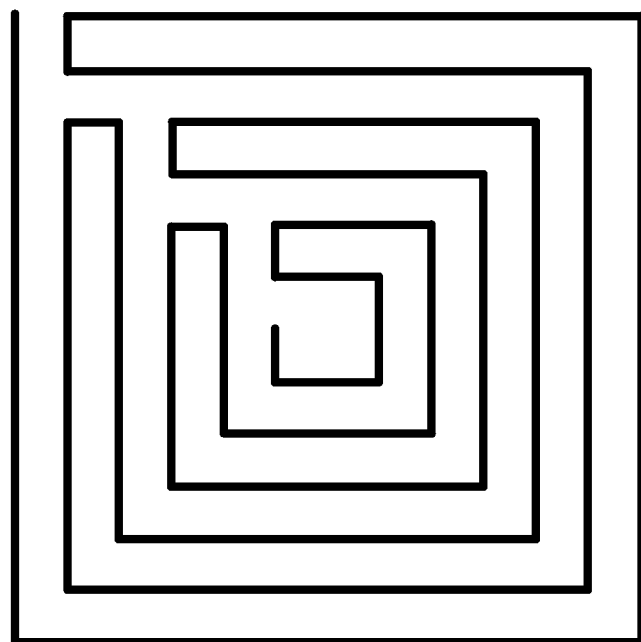
FIG. 20 illustrates a coil including successive nested coils with substantially the same shape with connectors.

FIG. 19 illustrates another embodiment of the body antenna. The only difference of the body antennas in FIG. 15 and FIG. 19 is the shape of the coils. In FIG. 15 the coils are in a triangular shape, and in FIG. 19 the coils are in a rectangular shape. Further, any coil shape (for example, circular, oval, elliptical, or any polygon) may be used that provides the desired inductance value. The coils may form a spiral. Alternatively, the coil may include successive nested coils with substantially the same shape with connectors as illustrated in FIG. 20. Further, the coils may conform to the shape of the wireless body product.

Figure 21:
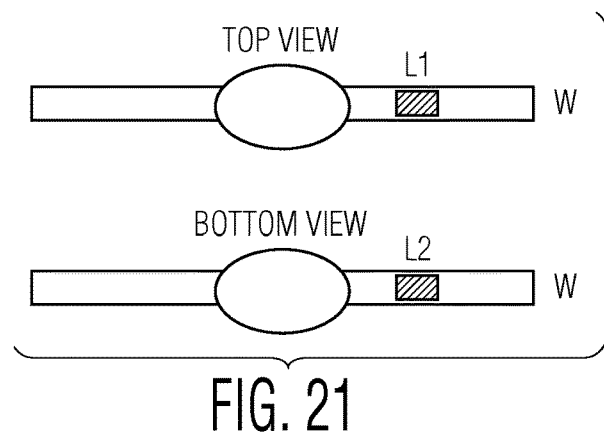
FIG. 21 illustrates an embodiment of a wristband including body antennas.

FIG. 21 illustrates an embodiment of a wristband including body antennas. Any of the body antenna embodiments described above may be used in FIG. 21. In FIG. 21, both coils, L1 and L2 may be attached to each side of a non-conductive wristband W. If the body antenna of FIG. 10 is used then the capacitive plate 1020 and coil 1010 may be on one side of the wristband and the capacitive plate 1030 may be on the other side of the wristband.

Figure 22:
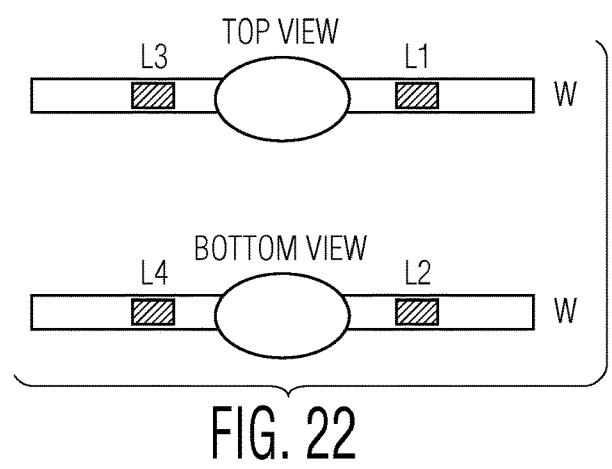
FIG. 22 illustrates another embodiment of a wristband using a body antenna.

FIG. 22 illustrates another embodiment of a wristband using a body antenna. In this second wristband, four coils L1, L2, L3 and L4 used and are connected via impedance Z1 to form a larger inductance. This results in two capacitors C1 and C2 formed by the four coils that are able to generate or receive electric fields.

Figure 23:
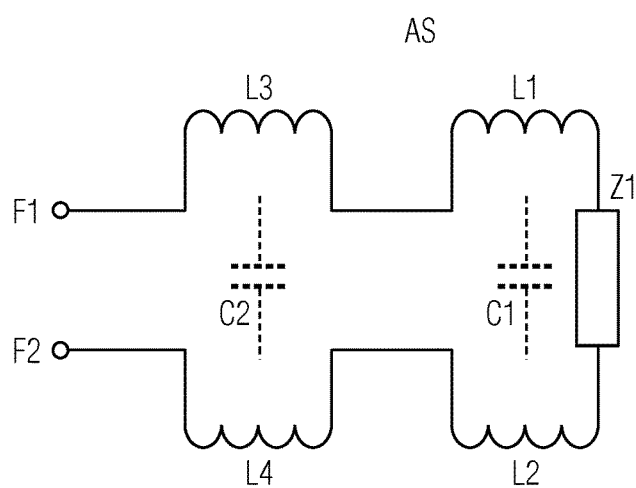
FIG. 23 illustrates the electric equivalent schematic of the body antenna in the wristband of FIG. 22.

FIG. 23 illustrates the electric equivalent schematic of the body antenna in the wristband of FIG. 22. As shown, the four coils L1, L2, L3, and L4 are in series and form to capacitors C1 and C2 connected in parallel.

The body antenna AS has been evaluated by the construction of an ear-bud product intended to be worn in the ear canal. The ear-bud acted as the receiver. The ear-bud has dimensions of 10 by 10 by 3 mm. At both front and back side of the ear-bud a coil is attached. Each coil has an inductance of 1 uH. The capacitance between the coils is 0.8 pF. Both coils are connected in series with a connection impedance of 0 ohms and tuned with a tuning capacitor C2 to a desired resonance frequency.

Measurements show that such an antenna system has a gain of 6 db in sensitivity receiving electric and magnetic fields versus receiving only magnetic induction field.

Now a few applications of the above described EIR system using the body antennas will be described below. In the use cases below a traditional magnetic induction (MI) radio in a hearing aid is replaced by an EIR. MI systems require the use of relatively large ferrite coils as the antennas, thus restricting how small the hearing aid may be. Further, MI communication is very sensitive to coil orientation. Accordingly, in remote or bridge devices two orthogonal coils are used to increase the chance of successful communication. This increases size, cost, and complexity of the remote or bridge device. In some solutions, the coil may be integrated into a neck loop of the remote or bridge device. This strap is in plain sight and may create privacy issues for the hearing aid user.

Figure 24:
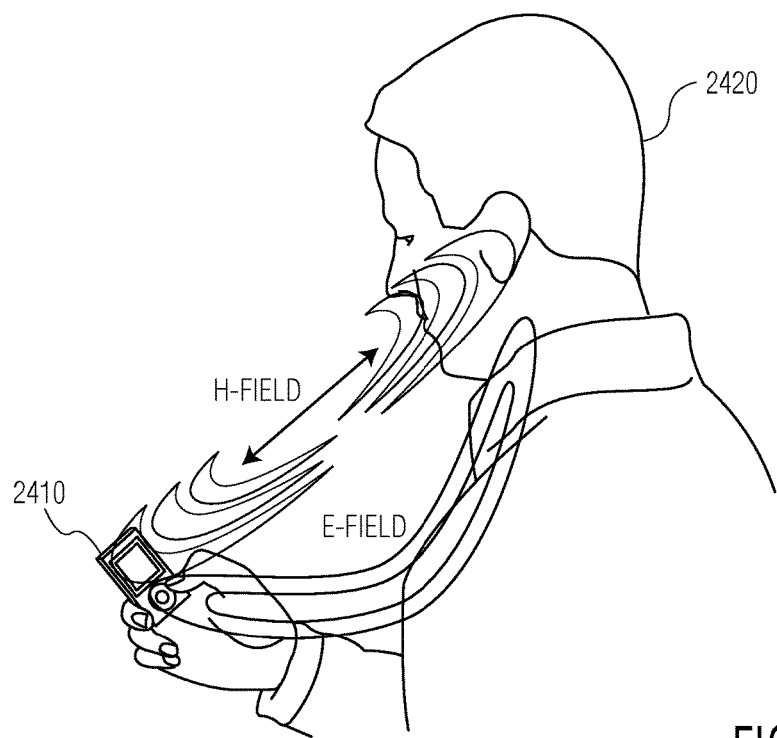
FIG. 24 illustrates a remote control interacting with a hearing aid where the hearing aid uses an EIR radio.

Hearing aids have historically made use of magnetic induction (MI) radio for communication between a hearing aid and an external device such as a remote control or a bridge device. FIG. 24 illustrates a remote control 2410 interacting with a hearing aid 2420 where the hearing aid 2420 uses an EIR radio. A remote control device 2410 may be used by the hearing aid wearer to change settings such as, e.g., volume and the selected program of the hearing aid 2420. The communication between the remote control device 2410 and the hearing aid 2420 may use electromagnetic induction communication.

Figure 25:
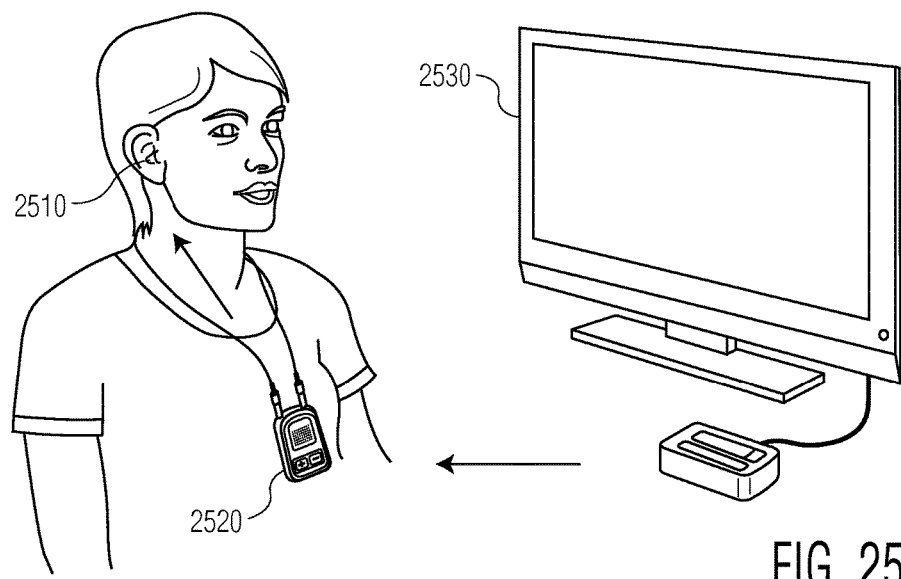
FIG. 25 illustrates a bridging device receiving audio data from a TV using Bluetooth.

A bridge device bridges communication between the hearing aid and some other audio source for example. The bridge device supports various use cases. FIG. 25 illustrates a bridging device 2510 receiving audio data from a TV 2530 using Bluetooth. The bridge device 2510 then forwards the audio data to the hearing aids 2520 using EIR communication.

Figure 26:
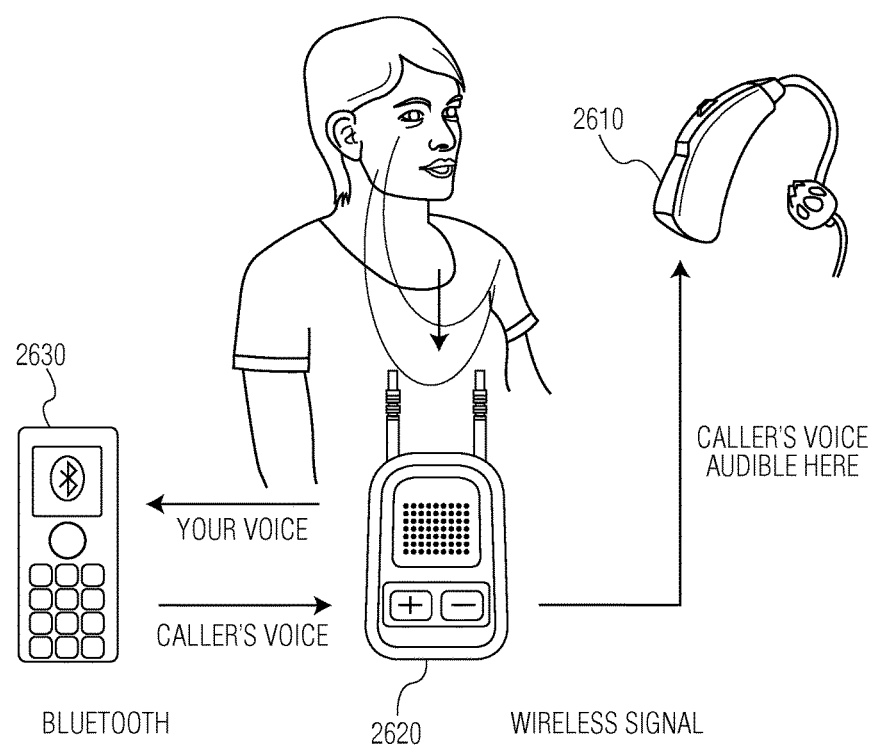
FIG. 26 illustrates a bridge device 2610 receiving audio data from a phone 2630 using Bluetooth.

FIG. 26 illustrates a bridge device 2610 receiving audio data from a phone 2630 using Bluetooth. The bridge device 2610 then forwards the audio data from the phone 2630 to the hearing aid 2620 using EIR radio communication. Additionally, microphone data from either the hearing aid 2620 or from a microphone in the bridge device 2610 is transmitted wirelessly to the phone 2630 in a similar fashion.

The use of EMI communication between a hearing aid and a remote or bridge device may provide various benefits including the following benefits. An EIR may provide a substantially better link budget than an MI radio (for example, up to 30 dB) for on-body communication. As a result, the transmit power of the external device may be lowered accordingly, resulting in increased battery lifetime and/or smaller batteries. Because lower transmit powers translate into lower transmit voltages this in turn also potentially removes the need for a discrete power amplifier as the voltage levels become more compatible with CMOS technology. This also implies that a symmetric link may be established between hearing aid and the remote control which simplifies the communication and allows the remote control to read back information from the hearing aid.

Figure 27:
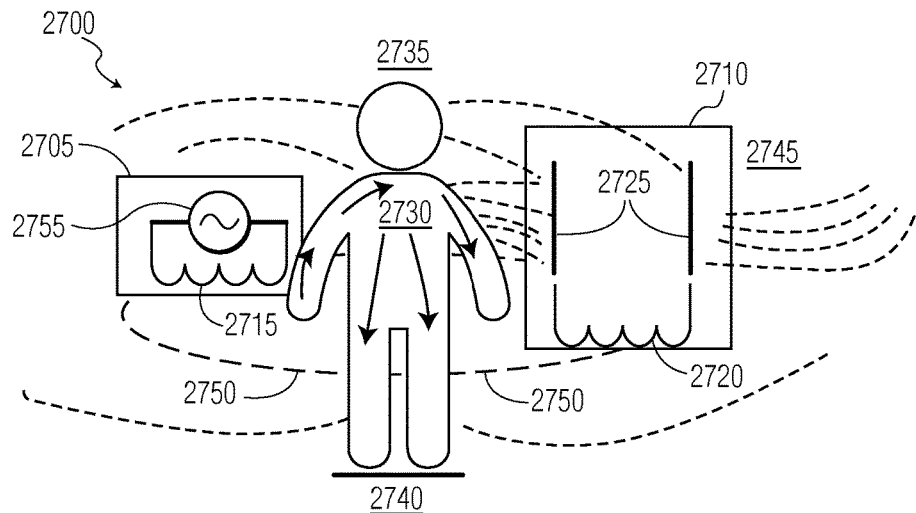
FIG. 27 illustrates another embodiment of an EIR system.

FIG. 27 illustrates another embodiment of an EIR system. The EIR system includes a transmitter 2705 in communication with a receiver 2710. This transmitter 2705 is similar to the transmitter XMTR in FIG. 1, except that it uses only a coil 2715 for its antenna. The coil 2715 is coupled to a source 2755 similar to sources S1 or S2 in FIG. 1. The source 2755 may drive a current through antenna coil 2715 and generating a magnetic field that is passed through the body 2735 with the same attenuation as in air because the magnetic permeability $\mu$ is the same for the human body bio material as for air. The magnetic field is attenuated by the 3rd power of the distance, which is an attenuation of 18 db per doubling of the distance. The body 2735 may be positioned on a floor 2740 which may be conductive or not.

The coil 2715 is positioned close to the human skin and may make contact or not. The coil 2715 generates a magnetic field 2750. The magnetic field 2750 generates an electric field 2745 with a direction perpendicular to the body 2735. This electric field is bound to the human body 2735. As a result an electric field 2745 is available around the body 2735. The receiver 2710 may receive and detect this electric field 2745.

The electric field may induce weak currents 2730 in the body 2735. The electric field 2745 may be measured around and on the whole body 2735 and is strongest near the coil 2715. The electric field 2745 is attenuated less than magnetic field 2750 along the body. However the irregular shape of the body along a transmission path may provide additional attenuation. This is different compared with a transmission path in air where the electric field is attenuated with the 3rd power of the distance.

Coil 2715 can be any design. Such design may be made to produce as strong of a magnetic and electric field as possible within the physical constraints of the device implementing the transmitter 2705. A larger coil may produce a larger magnetic and electric field. Further, a planar coil may produce a larger magnetic and electric field than a coil using a magnetic core. The increase in electric field may be due to the capacitance between the adjacent windings of the coil. Further, larger voltages across the coil will produce stronger magnetic and electric fields.

The receiver 2710 is similar to the receiver RCVR in FIG. 1. It receives the magnetic field 2750 and electric field 2745 generated by the coil 2715. Thus the transmitter 2715 produces induction fields including magnetic fields 2750 and electric fields 2745 close to the body that may be received the receiver 2710 at another place at the body. As previously described, these induction fields may be received by the receiver 2710 using two antennas. The first antenna which is a coil 2720 is sensitive to the magnetic field 2750, and the second which is a capacitor 2725 is sensitive to the electric field 2745. The signals from both antennas may be combined in an efficient way to establish a communication link budget that is superior to a magnetic induction (MI)

system. The operation of the receiver 2710 is similar to the operation of the receiver RCVR in FIG. 1.

Figure 28:
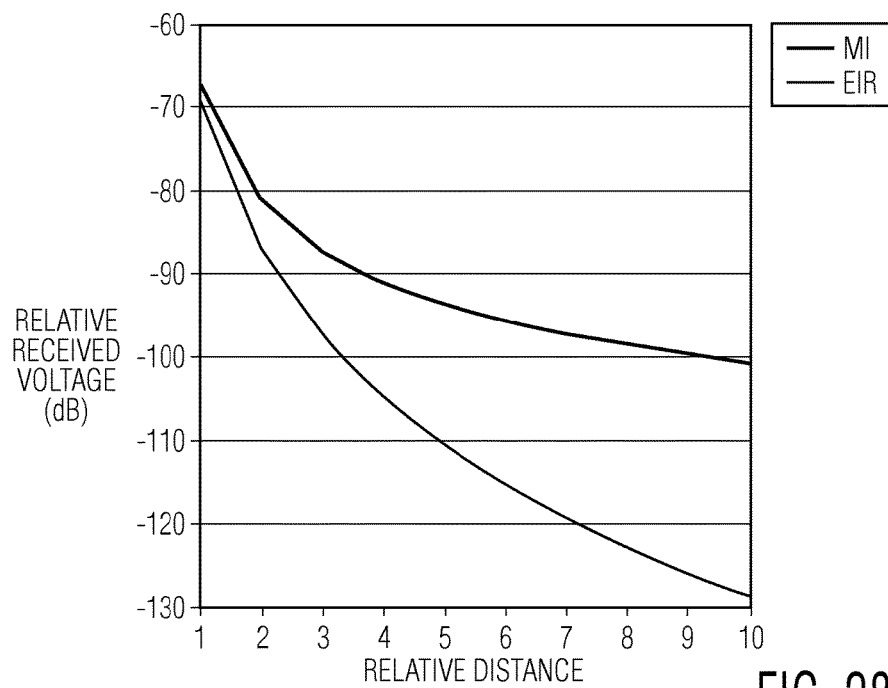
FIG. 28 illustrates simulation results comparing the received voltage in the EIR system of FIG. 27 with a MI system.

FIG. 28 illustrates simulation results comparing the received voltage in the EIR system of FIG. 27 with a MI system.

In the EIR system, a ferrite coil of 9 mm long and a diameter of 2 mm was used as the transmitter antenna. This sort of hearing aid coil is used today in a behind the ear application. The coil is positioned 2 mm from the skin of a human.

Two receiver antennas were positioned at another position at the human body. The electric sensitive antenna is a capacitor with rectangular plates of 20×20 mm and 4 mm separation. The magnetic sensitive antenna was a ferrite coil of 9 mm long and a diameter of 2 mm like that used as the transmitter antenna. Both electric and magnetic antennas are combined in a parallel resonance circuit and the relative received voltage as recorded as shown in FIG. 28. Further, voltages for the MI system were recorded as well as also shown in FIG. 28. It can be seen that the received voltage according the EIR system is always higher as compared with the art magnetic induction system.

Thus by not having the capacitor plates in the EIR system 2700 space is saved. Further, while the performance of the EIR system 2700 of FIG. 27 is not quite as good as the performance of the EIR system of FIG. 1, such decreased performance may be acceptable in applications where space is a premium. Further, two-way communication is still possible with the EIR system 2700. The communication performance in the two different directions will not be the same, but in certain applications such asymmetry may be acceptable.

Accordingly, an EIR communication system is still possible where the one of the transmitter/receiver uses only a coil for an antenna as long as the other transmitter/receiver using both a coil and a capacitor. This still allows for communication around a body. Further, the use of EIR improves performance over a system that only use one of the fields.

For all of the EIR embodiments described above, the EIR embodiments are much less sensitive to the relative orientation of both antennas than MI radio. Hence, the use of multiple coils in the external device to provide antenna diversity may be avoided while still having robust communication under all circumstances and orientations.

Also, efficient EMI antennas may be constructed without making use of ferrite rod-based coils but by simple planar wound coils and capacitance plates as described above. This may reduce the required antenna volume and allows for further miniaturization of the remote device. Additionally, it avoids the use of expensive ferrite rods.

All of the benefits mentioned above allow for external devices that may be substantially smaller and/or be built in new form factors. One particularly attractive embodiment for a bridge device or a remote control could be in the form of an elegant smart watch, which may be worn inconspicuously around the wrist hence protecting the privacy of the hearing aid wearer.

Another important use case for the above described EIR system using the body antennas involves the binaural use case where audio from the one hearing aid is transmitted to the other hearing aid and vice versa. This allows the hearing aids to perform audio beam forming, resulting in increased intelligibility of sounds for the hearing aid user. Support of binaural communication has however been limited mostly so far to so-called behind-the-ear (BTE) devices because of size restrictions and small batteries. MI communication requires large ferrite rod MI antennas that cannot be used in in-the-ear (ITE) or in-the-canal (ITC) hearing aids. Further, MI transmission requires instantaneous current spikes that cannot be supplied by small batteries used in ITE and ITC devices.

The application of EIR to ITE and ITC hearing aids will result in effective communication between the EIR or ITE hearing aids. Because of the lower power requirements and the ability to build small and effective body antennas, binaural communication between ITE and ITC hearing aids is possible.

Although various embodiments described relate to a method of communicating near a living body, propagating objects other than a living body may be used in the described embodiments. The first and a second device may be connected through magnetic and electric near-field coupling using the propagating objects to help propagate the fields.

It should be appreciated by those skilled in the art that any block diagrams herein represent conceptual views of illustrative circuitry embodying the principles of the invention. Further, in the circuits shown additional elements may also be included as needed, or variations to the structure of the circuit may be made to achieve the same functional results as the circuits illustrated.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An electromagnetic induction wireless communication system comprising an electromagnetic induction antenna comprising:
   a first inductor including windings;
   a second inductor including windings spaced apart from the first inductor; and
   an impedance connecting the first and second inductors, wherein the first inductor and the second inductor form parallel plates of a capacitor configured to act as an electric field antenna, and wherein the first inductor and the second inductor together form a combined inductor configured to act as a magnetic field antenna, wherein the electromagnetic induction antenna is configured to communicate using a reactive electric field that is coupled to a living body, the reactive electric field has a direction perpendicular to a surface of the living body, and the reactive electric field is available around the living body.

2. The electromagnetic induction wireless communication system of claim 1, further comprising:
   a tuning capacitor coupled to the first inductor and the second inductor to create a resonating circuit that is configured to operate at a specific frequency.

3. The electromagnetic induction wireless communication system of claim 1, further comprising a transmitter comprising:
   the electromagnetic induction antenna; and
   a signal source configured to produce a first communication signal used to drive the electric field antenna to produce the reactive electric field in a near-field region of the electric field antenna and to drive the magnetic field antenna to produce a reactive magnetic field in a near-field region of the magnetic field antenna, wherein the transmitter, when positioned at a location on the living body, is configured to communicate with a receiver positioned at another location on the living body.

4. The electromagnetic induction wireless communication system of claim 3, wherein the transmitter further comprises:
a voltage control unit coupled to the signal source configured to produce at least one of an amplitude difference and a phase difference between the communication signal used to drive the electromagnetic induction antenna.

5. The electromagnetic induction wireless communication system of claim 4, wherein the transmitter further comprises:
a controller, including a data processing unit and a signal processing unit, configured to control operation of the voltage control unit.

6. The electromagnetic induction wireless communication system of claim 3, further comprising a transceiver comprising:
the transmitter; and
a signal detector connected to the electromagnetic induction antenna configured to detect a second communication signal.

7. The electromagnetic induction wireless communication system of claim 6, wherein
the signal detector is configured to detect the second communication signal from a bridging device near the living body, wherein the second communication signal includes audio data from a remote device in communication with the bridging device.

8. The electromagnetic induction wireless communication system of claim 7, wherein
the signal source is configured to transmit the first communication signal to the bridging device coupled to the living body.

9. The electromagnetic induction wireless communication system of claim 6, wherein
the signal detector is configured to detect the second communication signal received from a remote control device near the living body, wherein operation of the transceiver is configured to be controlled by the second communication signal received from the remote control device.

10. The electromagnetic induction wireless communication system of claim 9, wherein
the signal source is configured to transmit the first communication signal to the remote control device coupled to the living body.

11. The electromagnetic induction wireless communication system of claim 6, wherein
the signal source is configured to transmit the first communication signal to a wrist mounted device coupled to the living body.

12. The electromagnetic induction wireless communication system of claim 11, wherein
the signal detector is configured to detect the second communication signal received from the wrist mounted device coupled to the living body.

13. The electromagnetic induction wireless communication system of claim 1, further comprising a receiver comprising:
the electromagnetic induction antenna; and
a signal detector connected to the electromagnetic induction antenna configured to detect a communication signal received from a transmitter positioned near the living body via the reactive electric field received by the electric field antenna and a reactive magnetic field received by the magnetic field antenna.

14. The electromagnetic induction wireless communication system of claim 1, wherein
the electromagnetic induction antenna is implemented in a wrist mounted device that comprises one of a display device, a remote control device, and a bridging device coupled to the living body, wherein the bridging device is in communication with one or more remote devices.

15. The electromagnetic induction antenna of claim 1, wherein the combined inductor has an inductance larger than inductances of the first inductor and the second inductor.

16. The electromagnetic induction antenna of claim 1, wherein the first inductor is a first planar coil and the second inductor is a second planar coil that is parallel to the first planar coil, and wherein the capacitor has a capacitance proportional to a physical separation between the first inductor and the second inductor.

17. The electromagnetic induction wireless communication system of claim 1, wherein the electromagnetic induction antenna is implemented in a hearing aid device, and the first inductor and the second inductor are each fitted on different sides of housing of the hearing aid device.

18. A wrist mounted device comprising:
a first inductor;
a second inductor spaced apart from the first inductor;
an impedance connected to a first terminal of the first inductor and a first terminal of the second inductor, wherein the first inductor and the second inductor form parallel plates of a first capacitor configured to act as a first electric field antenna;
a third inductor having a first terminal connected to a second terminal of the first inductor;
a fourth inductor having a first terminal connected to a second terminal of the second inductor, the fourth inductor spaced apart from the third inductor, wherein the third inductor and fourth inductor form parallel plates of a second capacitor configured to act as a second electric field antenna, wherein the first, second, third, and fourth inductors together form a combined inductor to act as a magnetic field antenna, and wherein the wrist mounted device is configured to communicate using a reactive electric field that is coupled to a living body, the reactive electric field has a direction perpendicular to a surface of the living body, and the reactive electric field is available around the living body; and
a signal source having a first terminal connected to a second terminal of the third inductor and a second terminal connected to a second terminal of the fourth inductor, the signal source configured to produce a communication signal used to drive the first and second electric field antennas to produce the reactive electric field and drive the magnetic field antenna to produce a reactive magnetic field, wherein the wrist mounted device, when coupled to the living body, is configured to communicate with another wrist mounted device coupled to the living body using the reactive electric field and the reactive magnetic field.

19. The wrist mounted device of claim 18, further comprising:
a signal detector connected to the first and second electric field antennas and the magnetic field antenna, the signal detector configured to detect the communication signal received from the other wrist mounted device coupled to the living body.

20. A wrist mounted device comprising:
a first inductor;
a second inductor spaced apart from the first inductor;
an impedance connected to a first terminal of the first inductor and a first terminal of the second inductor, wherein the first inductor and the second inductor form parallel plates of a first capacitor configured to act as a first electric field antenna;
a third inductor having a first terminal connected to a second terminal of the first inductor;
a fourth inductor having a first terminal connected to a second terminal of the second inductor, the fourth inductor spaced apart from the third inductor, wherein the third inductor and the fourth inductor form parallel plates of a second capacitor configured to act as a second electric field antenna, wherein the first, second, third, and fourth inductors together form a combined inductor to act as a magnetic field antenna, and wherein the wrist mounted device is configured to communicate using a reactive electric field that is coupled to a living body, the reactive electric field has a direction perpendicular to a surface of the living body, and the reactive electric field is available around the living body; and
a signal detector having a first terminal connected to a second terminal of the third inductor and a second terminal connected to a second terminal of the fourth inductor, the signal detector configured to detect a communication signal received from another wrist mounted device coupled to the living body using the reactive electric field received on the first and second electric field antennas and a reactive magnetic field received on the magnetic field antenna.

* * * * *